US 8,019,921 B2

(12) United States Patent
Patel (10) Patent No.: US 8,019,921 B2
(45) Date of Patent: Sep. 13, 2011

(54) INTELLIGENT MEMORY BUFFER (75) Inventor: Shwetal A. Patel, San Jose, CA (US)

(73) Assignee: Globalfoundries, Inc., Grand Cayman (KY)

( * ) Notice: Subject to any disclaimer, the term of this patent is extended or adjusted under 35 U.S.C. 154(b) by 174 days.

(21) Appl. No.: 12/271,213

(22) Filed: Nov. 14, 2008

(65) Prior Publication Data

US 2010/0125681 A1    May 20, 2010

(51) Int. Cl.
G06F 13/00 (2006.01)
G06F 3/00 (2006.01)

(52) U.S. Cl. ............. 710/52; 710/5; 710/8; 710/14; 710/15

(58) Field of Classification Search .............. None
See application file for complete search history.

(56) References Cited

U.S. PATENT DOCUMENTS

| 6,681,301 | B1 | 1/2004 | Mehta et al. | |
|---|---|---|---|---|
| 2005/0038924 | A1* | 2/2005 | Takahashi | 710/5 |
| 2008/0052462 | A1 | 2/2008 | Blakely et al. | |

OTHER PUBLICATIONS

JEDEC Standard, "Definition of the Low Voltage SSTE32882 Registering Clock Driver with Parity and Quad Chip Selects for DDR3 RDIMM Applications," JESDxx-x, Item #104 Proposal, JEDEC Solid State Technology Association, Sep. 2008, §2.7, pp. 34-42.
JEDEC Standard, "DDR3 SDRAM Standard," JESD79-3, JEDEC Solid State Technology Association, Jun. 2007, 188 pages.

* cited by examiner

Primary Examiner — Tariq Hafiz
Assistant Examiner — Scott Sun
(74) Attorney, Agent, or Firm — Zagorin O'Brien Graham LLP (57) ABSTRACT A technique reduces cost, complexity and/or power consumption of a memory system by including intelligence in a memory buffer circuit of the memory system. An apparatus includes a memory buffer circuit configured to selectively operate in one of a plurality of modes. In a first mode, the memory buffer circuit is configured to interface to a first type of memory device, is configured to enable an input circuit of the memory buffer circuit, and is configured to drive on a terminal of a memory interface of the memory buffer circuit a version of a signal received by the input circuit during a memory operation. In a second mode, the memory buffer circuit is configured to interface to the first type of memory device, is configured to disable the input circuit, and is configured to drive a signal on the terminal during the memory operation.

5 Claims, 6 Drawing Sheets

INTELLIGENT MEMORY BUFFER

BACKGROUND

1. Field of the Invention

This invention relates to memory systems and more particularly to memory systems including memory buffer circuits.

2. Description of the Related Art

A typical memory system includes a memory buffer circuit that provides an interface between one or more memory circuits and a memory controller circuit. The memory buffer circuit includes register circuits that are used to buffer data and control signals communicated between the memory circuits and the memory controller circuit. The buffering of these signals relaxes one or more of the signal timing constraints, thereby improving reliability of the memory system. The memory buffer circuit and the one or more memory circuits may be included on a printed circuit board to form a memory module (e.g., a dual in-line memory module (DIMM)).

In general, a DIMM includes multiple dynamic random access memory (DRAM) circuits. Those DRAM circuits may have a 4-bit data width (i.e., x4 data width), an 8-bit data width (i.e., x8 data width), or other suitable data width (e.g., 16-bit data width, i.e., x16 data width). A typical memory controller circuit is designed to simultaneously access a full data bus width (i.e., a full-word) of the memory module. Accordingly, to provide a full-word of data (e.g., 64-bits of data per word) per memory access, typical DIMMs include multiple DRAMs of the same data width, e.g., multiple x4 DRAMs (i.e., x4 DIMM) or multiple x8 DRAMs (i.e., x8 DIMM).

SUMMARY

A technique reduces cost, complexity, and/or power consumption of a memory system by including intelligence in a memory buffer circuit of the memory system. In at least one embodiment of the invention, an apparatus includes a memory buffer circuit configured to selectively operate in one of a plurality of modes. In a first mode of the plurality of modes, the memory buffer circuit is configured to interface to a first type of memory device, is configured to enable an input circuit of the memory buffer circuit, and is configured to drive on a terminal of a memory interface of the memory buffer circuit a version of a signal received by the input circuit during a memory operation. In a second mode of the plurality of modes, the memory buffer circuit is configured to interface to the first type of memory device, is configured to disable the input circuit, and is configured to drive a signal on the terminal during the memory operation.

In at least one embodiment of the invention, an apparatus includes a memory controller circuit configured to communicate a command to a memory module. The command indicates one of a plurality of modes of operation. In a first mode of the plurality of modes of operation, a first signal is communicated between the memory controller circuit and the memory buffer circuit during a memory operation. In a second mode of the plurality of modes of operation, the first signal is not communicated between the memory controller circuit and the memory buffer circuit during the memory operation.

In at least one embodiment of the invention, a method includes, during a memory operation, driving on a terminal of a memory interface of a memory buffer circuit a version of a signal received by an input circuit of the memory buffer circuit during a memory operation in a first mode of operation of a plurality of modes of operation. The method includes effectively disabling the input circuit of the memory buffer circuit during the memory operation in a second mode of operation of the plurality of modes of operation. The method includes driving a signal on the terminal of the memory interface of the memory buffer circuit in the second mode of operation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The Joint Electron Device Engineering Council (JEDEC) promulgates standard memory circuit and memory module specifications, e.g., a Double Data Rate Three (DDR3) Synchronous Dynamic Random Access Memory (SDRAM) specification. A typical memory controller interface that satisfies the DDR3 specification includes data signals (DQ), data strobe (DQS), and data mask (DM) pins. The data strobe signal is a source synchronous signal and thus, is bidirectional. The memory controller circuit provides data strobes and the data signals during write operations. The DRAM provides the data strobes and the data signals during read operations. In some memory systems, the DM signal is used to mask data bits during write cycles. Masking data allows writes to the memory on only one of the two edges of a data strobe that occur in a cycle.

Figure 1:
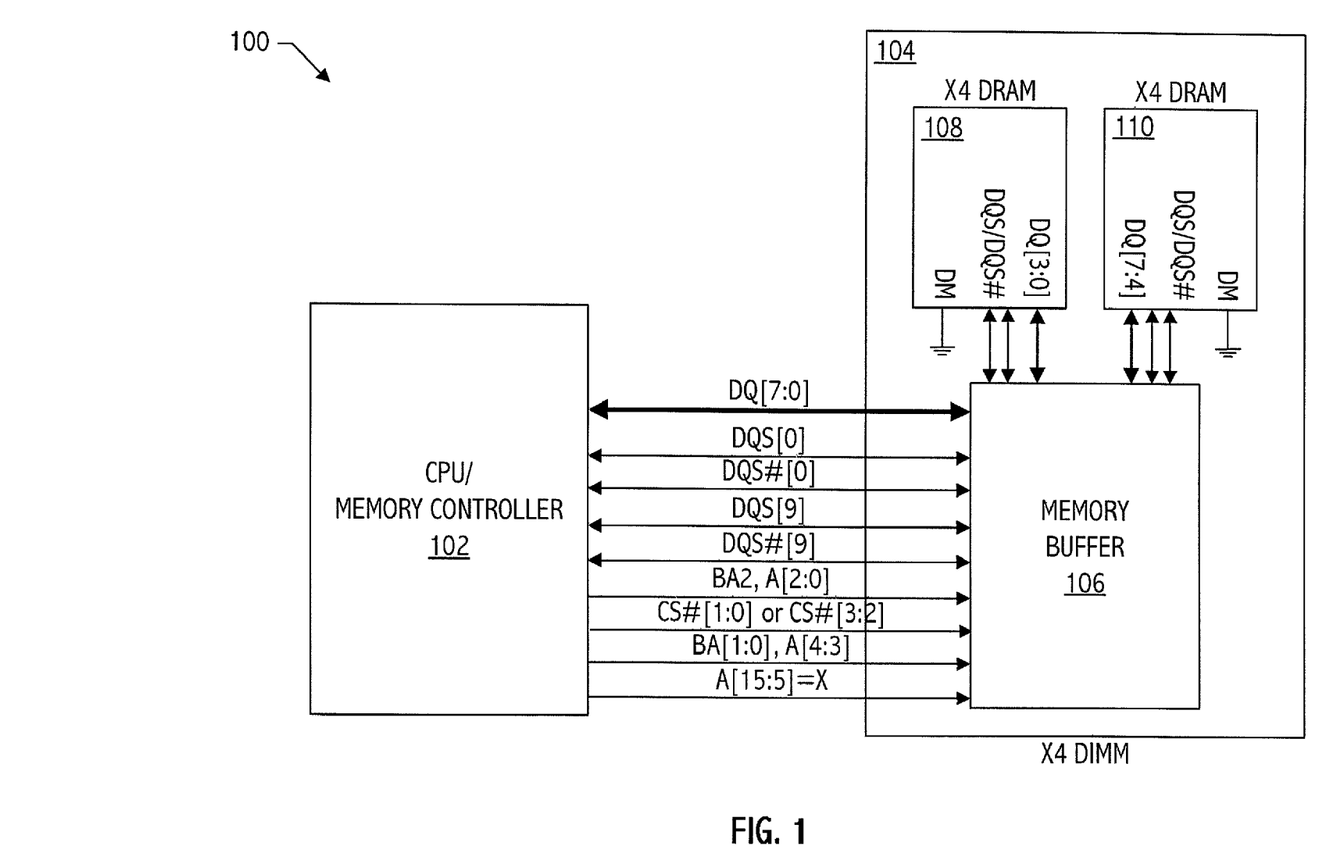
FIG. 1 is a block diagram of an exemplary memory system including at least one x4 DIMM.

Referring to FIG. 1, an exemplary memory system (e.g., memory system 100) includes a memory controller circuit (e.g., memory controller circuit 102) and at least one x4 DIMM (e.g., DIMM 104). DIMM 104 includes two x4 DRAM (e.g., DRAM 108 and DRAM 110) and memory buffer circuit 106. Memory controller circuit 102 and DIMM 104 are compliant with the "JEDEC Specification DDR3 SDRAM Standard JESD79-3," hereinafter, the "JEDEC DDR3 standard." However, memory controller circuit 102 and DIMM 104 may be compliant with other suitable memory standards.

Memory buffer circuit 106 can be any suitable memory buffer circuit known in the art that buffers memory signals and that performs interface functions required by the "JEDEC Standard Definition of the SSTE32882 Registering Clock Driver with Parity and Quad Chip Selects for DDR3 DIMM Applications," hereinafter, the "JEDEC SSTE32882 standard." Although only one byte lane of the DIMM and only one channel of memory system 100 is illustrated in FIG. 1, memory system 100 may implement multiple channels, each channel having a number of byte lanes of data sufficient to support at least one data word (e.g., eight byte lanes to support a 64-bit data word). Memory controller circuit 102 and memory buffer circuit 106 communicate data and data strobe signals (e.g., DQ[7:0], DQS[0], DQS#[0], DQS[9], and DQS#[9]). The data strobes are differential signals and one DQS signal pair is communicated for each nibble of data. Note that no data mask signal is used by the ×4 DRAM and accordingly, the DM terminals of DRAM 108 and DRAM 110 are grounded on DIMM 104. In addition, a control signal interface of memory system 100 (e.g., the control signal interface including control signals BA2, A[2:0], CS#[1:0], CS#[3:2], BA[1:0], A[4:3], and A[15:5]) is used by memory controller circuit 102 to configure memory buffer circuit 106 on DIMM 104. Note that other signals (not shown) may be communicated between memory controller circuit 102 and memory buffer circuit 106 (e.g., CK/CK#[0], RAS#, CAS#, WRITE_EN#, CKE[1:0], ODT[1:0], and/or other suitable signals).

Figure 2:
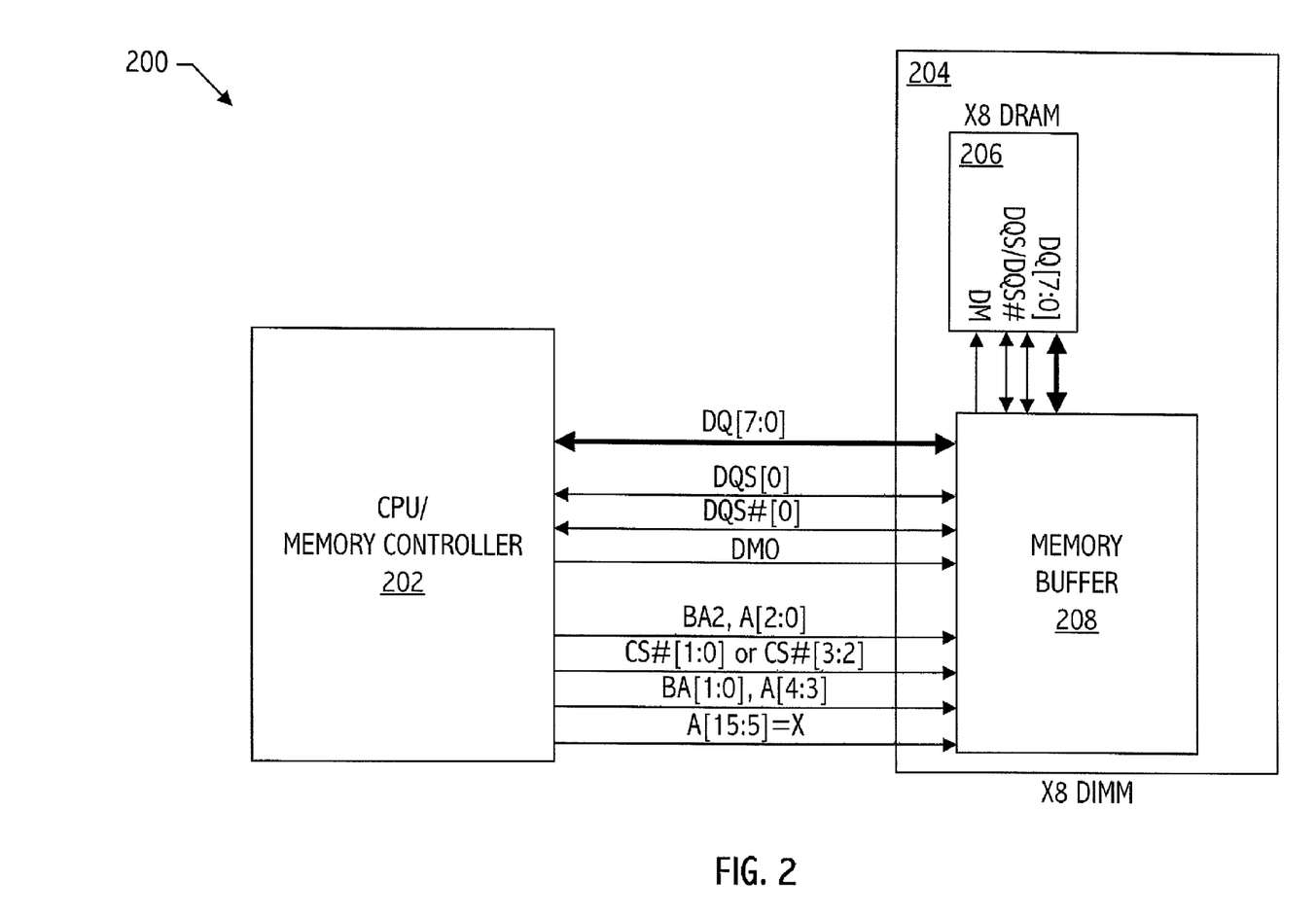
FIG. 2 is a block diagram of an exemplary memory system including at least one x8 DIMM.

Referring to FIG. 2, another exemplary memory system (e.g., memory system 200) includes a memory controller circuit (e.g., memory controller circuit 202) and a ×8 DIMM (e.g., DIMM 204). Memory controller circuit 202 and DIMM 204 are compliant with the JEDEC DDR3 standard. DIMM 204 includes a ×8 DRAM (e.g., DRAM 206) and a memory buffer circuit (e.g., memory buffer circuit 208). Memory buffer circuit 208 cam be any suitable memory buffer circuit that buffers memory signals and performs the interface functions required by the JEDEC SSTE32882 standard or other suitable specification. Although only one byte lane of data of the DIMM and only one channel of memory system 200 are illustrated, memory system 200 may implement multiple channels, each channel having a number of byte lanes of data sufficient to support at least one data word (e.g., eight byte lanes of data to support a 64-bit data word). Memory controller circuit 202 and memory buffer circuit 206 communicate data, a differential data strobe signal, and a data mask signal (e.g., DQ[7:0], DQS[0], DQS#[0], and DM0). These signals are communicated between memory controller 202 and DRAM 206 via memory buffer 208. In addition, a control signal interface of memory system 200 (e.g., the control signal interface including control signals BA2, A[2:0], CS#[1:0], CS#[3:2], BA[1:0], A[4:3], and A[15:5]) is used by memory controller circuit 202 to configure memory buffer circuit 206 on DIMM 204. Note that other signals (not shown) may be communicated between memory controller circuit 202 and memory buffer circuit 206 (e.g., CK/CK#[0], RAS#, CAS#, WRITE_EN#, CKE[1:0], ODT[1:0], and/or other suitable signals).

In memory systems that include a ×8 DIMM, during a write operation, the memory buffer circuit expects one DM input signal per byte lane from the corresponding memory controller and provides the one DM input signal per byte to the ×8 DIMM. In some applications, e.g., some server applications, ×4 DIMM, or other applications, the DM signal is not used. However, circuitry and pins are included on the memory controller circuit and memory buffer circuit to implement those functions, thereby increasing die size and pad usage, which may increase cost of the integrated circuits. For example, additional transmitter and receiver circuits and termination circuits may be included in the memory controller circuit or memory buffer circuit. Routing is included on printed circuit boards to provide connectivity for those signals. In addition, provision of DM signal activity dissipates power.

Figure 3:
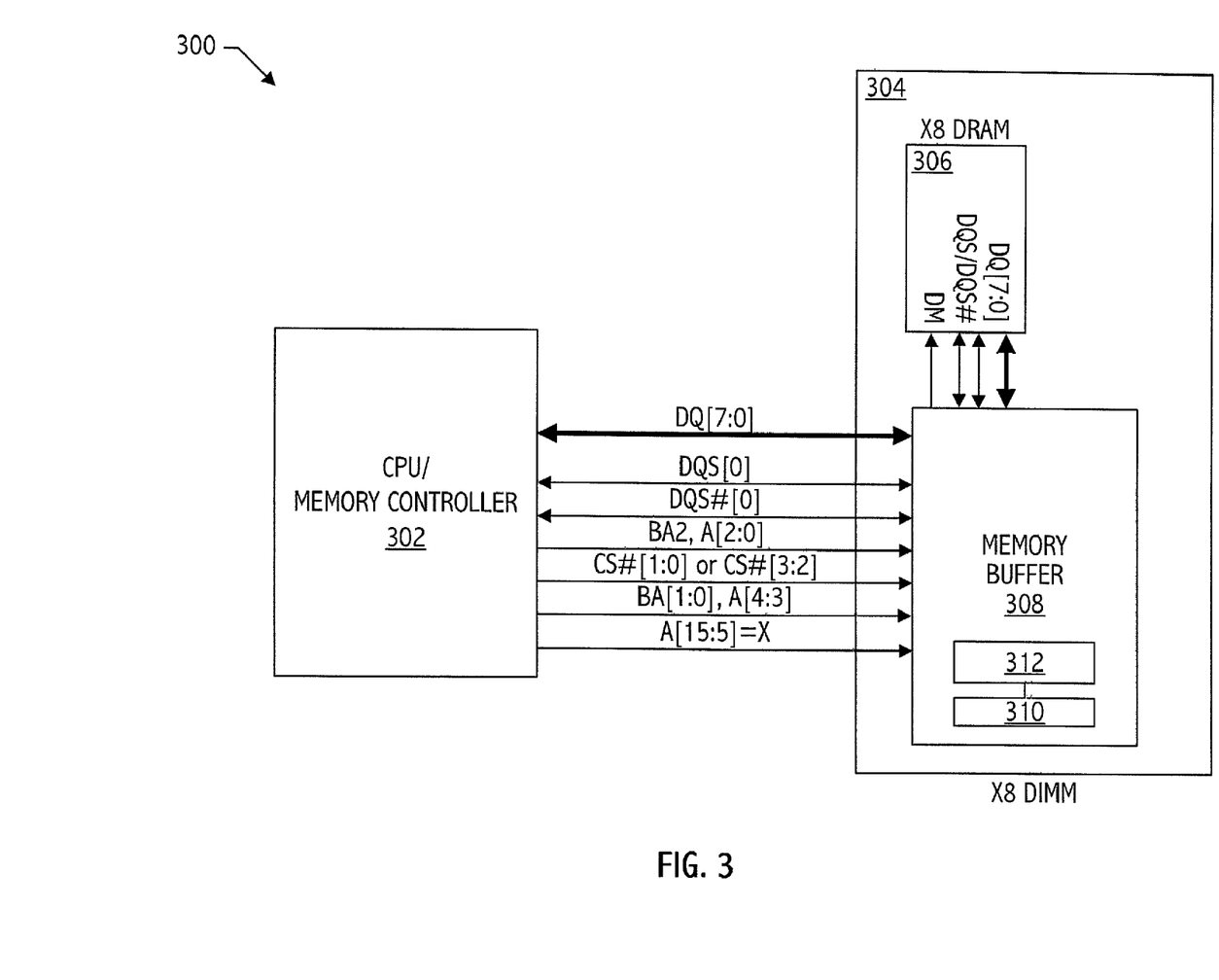
FIG. 3 is a block diagram of an exemplary memory system including at least one x8 DIMM consistent with at least one embodiment of the invention.

A technique reduces circuit requirements and power consumption of a memory system as compared to memory systems 100 and 200, by including intelligence in a memory buffer circuit of the memory system. Referring to FIG. 3, memory system 300 includes memory controller circuit 302 and DIMM 304, which in at least one embodiment of memory system 300, are compliant with the JEDEC DDR3 standard. Memory system 300 also includes an intelligent memory buffer circuit 308, which buffers memory signals and performs interface functions, e.g., those interface functions required by the JEDEC SSTE32882 standard. In addition, intelligent memory buffer circuit 308 includes control register 310 and control circuit 312. Control register 310 is configurable by memory controller circuit 302 via a control interface between memory controller circuit 302 and control circuit 312. For example, an SSTE32882 interface includes control lines BA2, A[2:0], which are used to access control registers included in intelligent memory buffer circuit 308 to configure intelligent memory buffer circuit 308. In at least one mode of the memory system, the SSTE32882 interface also may be used to access control register 310. In at least one mode of the memory system, memory controller circuit 302 accesses control bits stored in control register 310 by simultaneously asserting CS#[0] and CS#[1]. In at least one mode of the memory system, memory controller circuit 302 accesses control bits stored in control register 310 by simultaneously asserting CS#[2] and CS#[3]. In at least one mode of the memory system, memory controller circuit 302 accesses control bits stored in control register 310 by simultaneously asserting all of CS#[3:0]. During control word access, signals BA[1:0], A[4:3] provide a configuration pattern for control register 310.

In at least one embodiment, memory system 300 uses two bits of control register 310 to indicate a particular mode of operation. For example, a first setting (e.g., "10") of bits of control register 310 configures intelligent memory buffer circuit 308 for a first mode of operation, which is applicable when DRAM 306 is a ×8 DRAM. A second setting (e.g., "11") of the same bits of control register 310 configures intelligent memory buffer circuit 308 in a second mode of operation, also applicable when DRAM 306 is a ×8 DRAM, but configured for a second mode of operation. Note that other values of those bits may be used to indicate other modes of operation and/or may be used in conjunction with other control register settings, which is consistent with memory system 200 of FIG. 2. In addition, note that other signals (not shown) may be communicated between memory controller circuit 302 and intelligent memory buffer circuit 308 (e.g., CK/CK#[0], RAS#, CAS#, WRITE_EN#, CKE[1:0], ODT[1:0], and/or other suitable signals).

Referring back to FIG. 3, in at least one embodiment of memory system 300, memory controller circuit 302 configures intelligent memory buffer circuit 308 in the first mode of operation, in which intelligent memory buffer circuit 308 expects one DM signal per byte lane from memory controller circuit 302 during a write operation. In this mode, the intelligent memory buffer 308 enables receivers and terminations corresponding to one DM terminal per byte lane. In this mode, intelligent memory buffer circuit 308 also redrives each DM signal to DRAM 306.

In at least one embodiment of memory system 300, memory controller circuit 302 configures intelligent memory buffer circuit 308 in the second mode of operation, which does not expect DM signals from the memory controller.

Rather than redrive received DM signals to the DRAM as in memory systems 100 and 200, intelligent memory buffer circuit 308 disables input receiver circuits and termination circuits associated with the DM signals. Intelligent memory buffer circuit 308 includes a control circuit 310 that is configured to always drive a static low signal on the DM terminal of the DRAM interface when driving write data during write operations.

In at least one embodiment, in the second mode of operation, memory system 300 achieves substantial power savings by effectively eliminating operation of DM signals and associated circuitry. Accordingly, in embodiments for applications only using the second mode of operation, memory controller circuit 302 and intelligent memory buffer circuit 308 may be implemented without those DM signal pins that are effectively disabled in the second mode of operation. Thus, memory system 300 may achieve substantial die size reduction and thus, cost reduction, by eliminating the additional DM signal terminals (e.g., pins or bumps on a package) and associated circuitry. In addition, the simplified memory controller package and/or memory buffer package simplifies routing on an associated motherboard and/or associated DIMM, thereby reducing cost of the memory system. Note that since the intelligent memory buffer circuit is preconfigured to be in the second mode, no additional control complexity is introduced during memory system operation, i.e., the memory buffer does not perform intelligent decision making during actual memory accesses.

In at least one embodiment, memory buffer circuit 308 is configured in a ×4 memory system, or in another application that does not use the DM function, similar to FIG. 1. Note that in such an application, intelligent memory buffer circuit 308 can be configured by memory controller circuit 302 to operate consistent with the configuration illustrated in FIG. 1.

Figure 4:
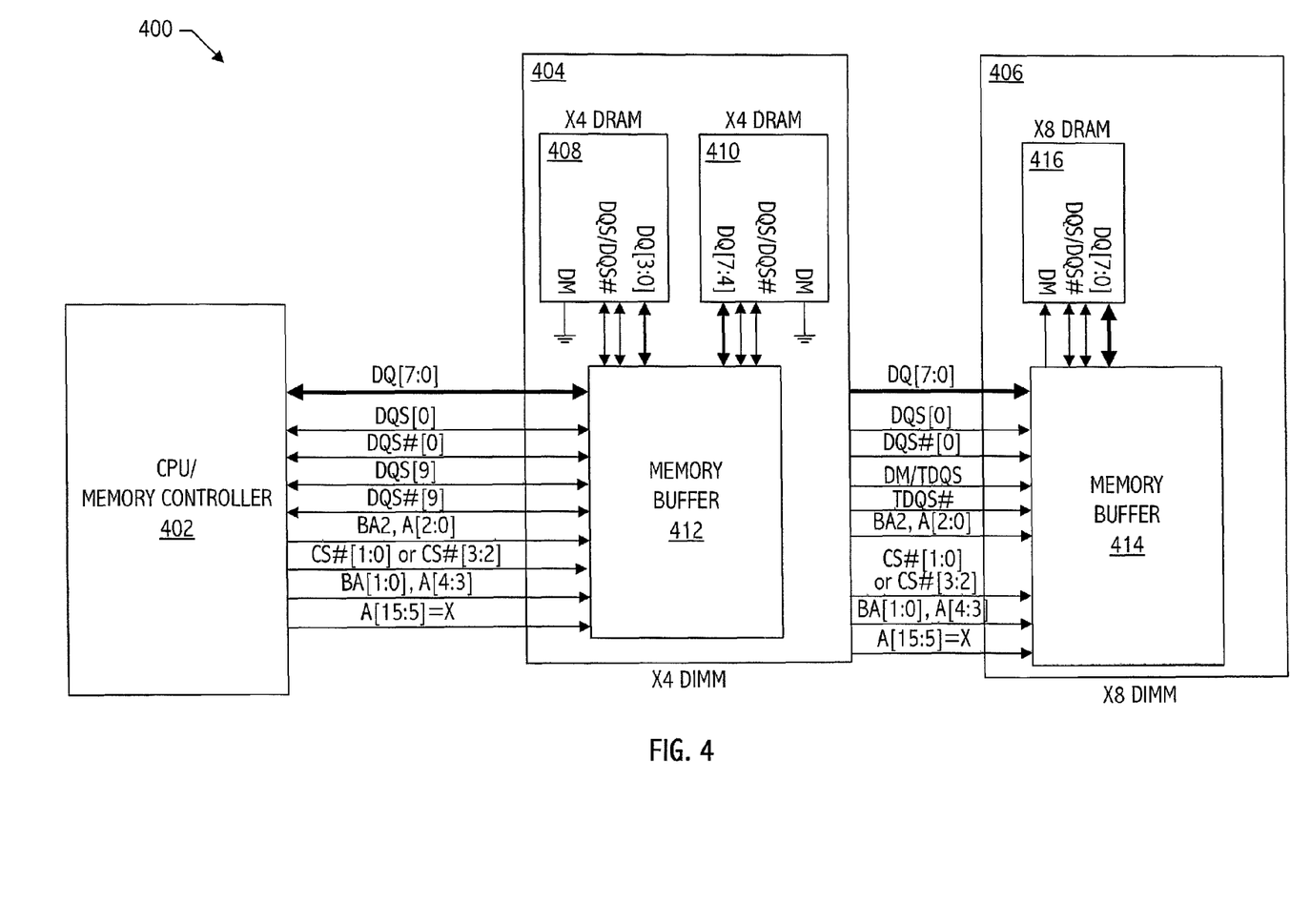
FIG. 4 is a block diagram of an exemplary memory system including at least one x4 DIMM and at least one x8 DIMM on a single channel.
Figure 5:
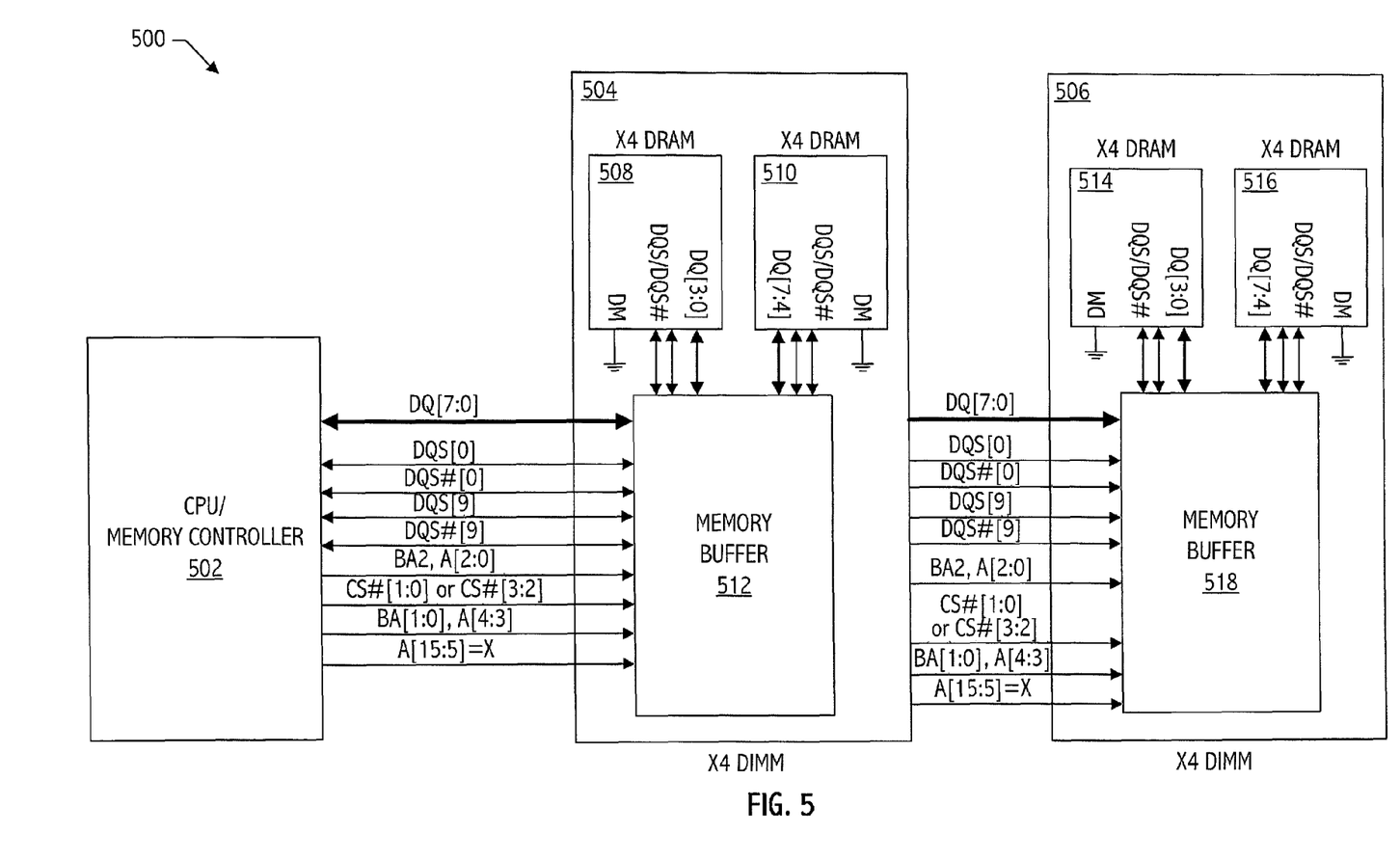
FIG. 5 is a block diagram of an exemplary memory system including at least two x4 DIMMs on a single channel.

Referring to FIGS. 4 and 5, an exemplary memory system (e.g., memory system 400 or memory system 500) includes a memory controller circuit (e.g., memory controller circuit 402 or memory controller circuit 502, respectively) and a ×4 DIG (e.g., DIMM 404 or DIMM 504, respectively). The memory controller circuits and DIMMs of memory system 400 and memory system 500 are compliant with the JEDEC DDR3 standard. Each of DIMM 404 and DIMM 504 includes ×4 DRAMs (e.g., DRAM 408 and DRAM 410 and DRAM 508 and DRAM 510, respectively) and memory buffer circuit 412 and memory buffer circuit 512, respectively. Memory buffer circuit 412 and memory buffer circuit 512 may be any suitable memory buffer circuit that buffers memory signals and that performs interface functions, e.g., those functions required by the JEDEC SSTE32882 standard or other suitable memory specification.

Memory system 400 and memory system 500 each includes an additional DIMM (e.g., DIMM 406 and DIMM 506, respectively) on the same channel as DIMM 404 and DIMM 504, respectively. In both memory system 400 and memory system 500, the memory buffer circuits on the ×4 DIMMs (e.g., memory buffer circuits 412, 512, and 518) are configured to receive two strobe signal pairs for each byte lane of data (i.e., one strobe signal pair per nibble of data) for read and write operations. The memory buffer circuit expects one DS signal per nibble (i.e., two DS signals per byte) from the memory controller circuit during a write operation and one DS signal per nibble from the DIMM during a read operation. The corresponding memory buffer circuits effectively enable receivers and termination circuits for each of those strobe signal pairs and redrive those signals accordingly.

Note that when the additional DIMM is a ×8 DIMM (e.g., DIMM 406), as illustrated in FIG. 4, only one strobe signal pair is communicated to the DIMM. However, a data mask signal is also provided to DIMM 406, which is shared with a termination function (TDQS). The termination function is available in memory buffer circuits for ×8 DIMMs and operates to terminate corresponding DQS signal lines in systems that include both a ×4 DIMM and a ×8 DIMM on the same channel of the memory system. In those mixed configuration systems (e.g., memory system 400), the DQS signal lines are coupled to termination circuits in memory buffer circuit 414. The termination circuits match the effective loading of a ×8 DIMM on the DQS lines to the effective loading of the ×4 DIMM on the DQS lines, thereby reducing differences in loading of the DQS lines that may affect system integrity. In addition, control signal interfaces of memory system 400 and memory system 500 (e.g., the control signal interface including control signals BA2, A[2:0], CS#[1:0], CS#[3:2], BA[1:0], A[4:3], and A[15:5]) are used by memory controller circuit 402 and memory controller circuit 502, respectively, to configure memory buffer circuits on corresponding DIMMs. Note that other signals (not shown) may be communicated between memory controller circuit 402 and memory controller circuit 502 and memory buffer circuits 412 and 414 and memory buffer circuits 512 and 518, respectively (e.g., CK/CK#[0], RAS#, CAS#, WRITE_EN#, CKE[1:0], ODT[1:0], and/or other suitable signals).

Figure 6:
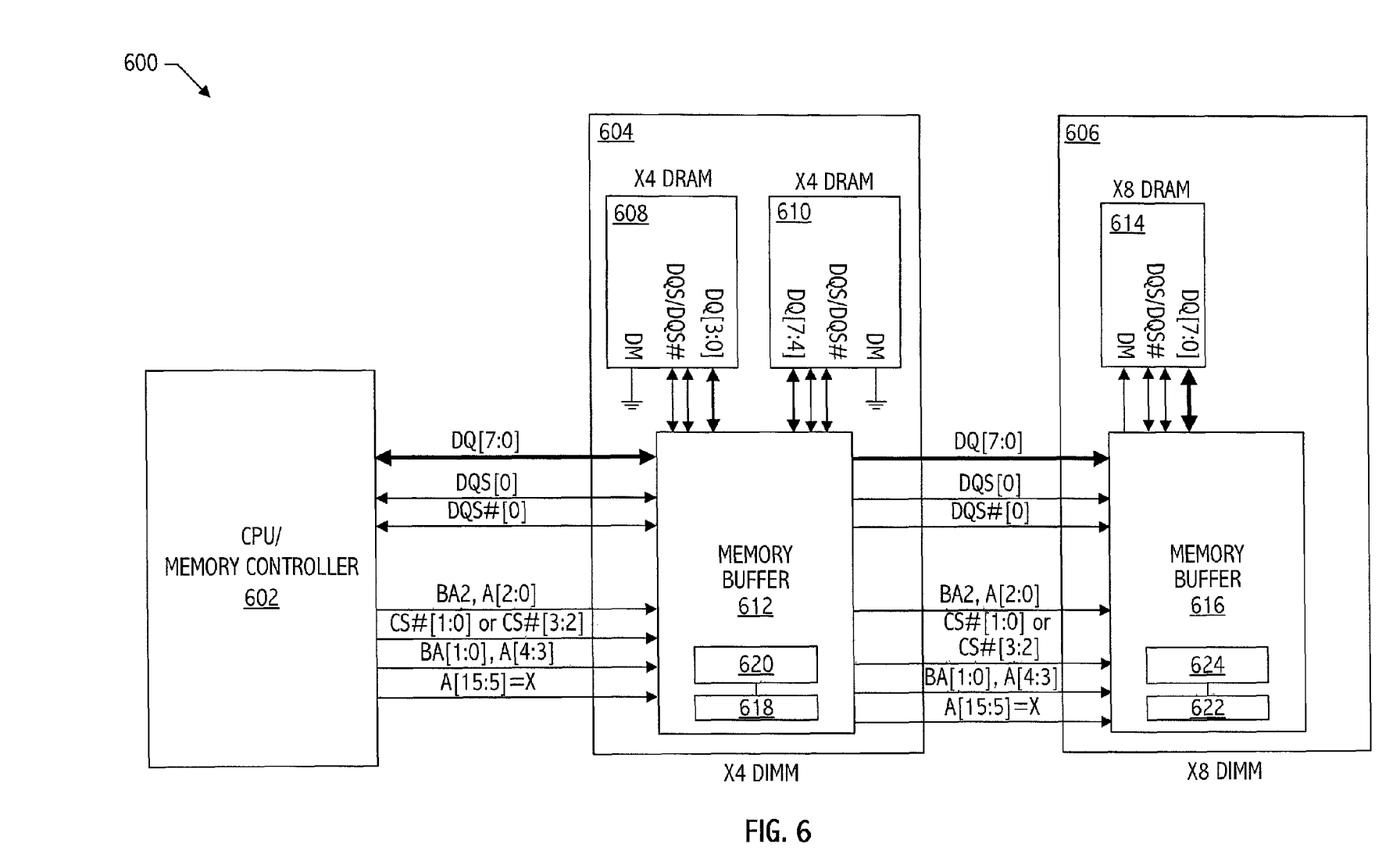
FIG. 6 is a block diagram of an exemplary memory system including at least one x4 DIMM and at least one x8 DIMM on a single channel consistent with at least one embodiment of the invention.

A technique reduces complexity and power consumption of a memory system as compared to memory system 400 or memory system 500, by including intelligence in the memory buffer circuit of the memory system. Referring to FIG. 6, memory system 600 includes memory controller circuit 602 and DIMM 604 and DIMM 606, which in at least one embodiment of memory system 600, are compliant with the JEDEC DDR3 standard. Memory system 600 also includes intelligent memory buffer circuit 612 and intelligent memory buffer circuit 616, which include control register 618 and control register 622, respectively, and control circuit 620 and control circuit 624, respectively. Control register 618 and control register 622 are configurable by memory controller circuit 602 via a control interface between memory controller circuit 602 and control circuit 620 and control circuit 624, respectively. For example, in at least one embodiment, the interface between memory controller circuit 602 and DIMM 604 and DIMM 606 is an SSTE32882 interface, which operates consistent with the interface described above with regard to memory system 300 of FIG. 3.

In at least one embodiment, memory system 600 uses two bits of control register 618 to indicate a particular mode of operation. For example, a first setting (e.g., "10") of bits of control register 618 configures intelligent memory buffer circuit 612 for a first mode of operation applicable when DIMM 604 is a ×4 DIMM. A second setting (e.g., "11") of the same bits of control register 618 configures intelligent memory buffer circuit 612 in a second mode of operation, also applicable when DIMM 604 is a ×4 DIMM configured for a second mode of operation. Note that other states of those bits may be used to indicate other modes of operation and/or may be used in conjunction with other control register settings. In addition, note that other signals (not shown) may be communicated between memory controller circuit 602 and intelligent memory buffer circuit 612 and intelligent memory buffer circuit 616 (e.g., CK/CK#[0], RAS#, CAS#, WRITE_EN#, CKE[1:0], ODT[1:0], and/or other suitable signals).

In at least one embodiment of memory system 600, memory controller circuit 602 configures intelligent memory buffer circuit 612 in the first mode of operation in which intelligent memory buffer circuit 612 transmits and receives one data strobe pair per nibble (i.e., a total of two data strobe pairs per byte) for read and write operations. Accordingly, intelligent memory buffer circuit 612, memory controller circuit 602, and DIMM 604 are configured consistent with memory controller circuit 402, DIMM 404, and memory buffer circuit 412 of FIG. 4. Referring back to FIG. 6, in this mode, intelligent memory buffer circuit 612 enables receivers and terminations corresponding to each strobe pair and redrives each strobe pair to corresponding ones of DRAM 608 and DRAM 610.

In at least one embodiment of memory system 600, memory controller circuit 602 configures intelligent memory buffer circuit 612 in the second mode of operation, in which intelligent memory buffer circuit 612 and memory controller circuit 602 communicate only one DQS pair per byte for read and write operations. Intelligent memory buffer circuit 612 effectively disables the second input receiver and termination associated with each byte of data (e.g., upper nine strobe pairs for each channel on an exemplary memory controller circuit interface). Thus, memory system 600 may achieve substantial power savings by eliminating the additional strobe signals. In addition, in at least one embodiment of memory system 600, memory controller circuit 602 may be simplified by eliminating a multiplexer circuit in a critical receive path of the memory controller circuit. For example, in memory controller circuit 402, a multiplexer circuit is included to select a suitable strobe signal from a single DQS signal received per byte (i.e., when configured for a x8 DIMM) and two received DQS signals per byte (i.e., when configured for a x4 DIMM). Accordingly, the performance of memory system 600 may be improved over the performance of memory system 400 for back-to-back reads that switch between DIMM 604 (i.e., x4 DIMM) and DIMM 606 (i.e., x8 DIMM) due to elimination of that multiplexer in memory controller circuit 602.

In at least one embodiment of intelligent memory buffer circuit 616, the termination function (TDQS) of memory buffer circuit 414, as described above, is eliminated since the additional DQS signals are no longer routed to the x4 DIMM and the x8 DIMM. In addition, in at least one embodiment, intelligent memory buffer circuit 616 is configured consistent with the second mode of intelligent memory buffer 308, described above and drives static low to the DM terminal of the interface of DRAM 614 when driving write data during write operations. Accordingly, the DM signal and associated circuitry may be disabled or eliminated from memory controller circuit 602 and intelligent memory buffer circuit 612 and intelligent memory buffer circuit 616, consistent with techniques described above with regard to memory system 300.

Referring back to FIG. 6, in at least one embodiment of memory system 600, for applications only using the second mode of operation for a x4 DIMM (e.g. some server or workstation applications), memory controller circuit 602 and intelligent memory buffer circuit 612 may be implemented without those DQS signal pins that are effectively disabled in the second mode of operation. Thus, memory system 600 may achieve substantial die size reduction and thus, cost reduction by eliminating the additional DQS signal terminals (e.g., pins or bumps on a package). In addition, simplified memory controller packages and/or memory buffer packages reduce routing on an associated motherboard and/or associated DIMM, thereby reducing memory system cost. Note that since intelligent memory buffer circuit 612 is preconfigured to be in the second mode for a x4 DIMM and intelligent memory buffer circuit 616 is preconfigured to be in a second mode for a x8 DIMM, no additional control complexity is introduced during memory system operation (i.e., intelligent memory buffer 612 and intelligent memory buffer circuit 616 do not perform intelligent decision making during actual memory accesses).

The description of the invention set forth herein is illustrative, and is not intended to limit the scope of the invention as set forth in the following claims. For example, although memory system 300 and memory system 600 are described as including memory components compliant with JEDEC DDR3 standards, techniques described herein are applicable to custom-designed memory controller circuits, memory buffer circuits and DIMMs, and memory systems compliant with other suitable memory standards (e.g., DDR4). In addition, memory system 300 and/or memory system 600 may be implemented with different numbers of channels and/or different word sizes. Variations and modifications of the embodiments disclosed herein may be made based on the description set forth herein, without departing from the scope and spirit of the invention as set forth in the following claims.

What is claimed is:

1. An apparatus comprising:
a memory controller circuit configured to communicate a command to a memory module including a memory buffer and a memory device, the command indicating one of a plurality of modes of operation,
wherein in a first mode of the plurality of modes of operation, a first signal is communicated between the memory controller circuit and the memory buffer circuit during a memory operation, and in a second mode of the plurality of modes of operation, the first signal is not communicated between the memory controller circuit and the memory buffer circuit during the memory operation,
wherein when the memory device has a 4-bit data width, when the memory operation is a write operation, in the first mode, the memory controller circuit is configured to transmit to the memory buffer circuit one data strobe signal per four bits of data, and in the second mode, the memory controller circuit is configured to transmit to the memory buffer circuit one data strobe signal per eight bits of data, and
wherein when the memory device has a 4-bit data width, when the memory operation is a read operation, in the first mode, the memory controller circuit is configured to receive from the memory buffer circuit one data strobe signal per four bits of data, and in the second mode, the memory controller circuit is configured to receive from the memory buffer circuit one data strobe signal per eight bits of data.

2. The apparatus, as recited in claim 1, further comprising:
the memory buffer circuit, wherein in the first mode, the memory buffer circuit is configured to enable an input circuit of the memory buffer circuit, and is configured to drive on a terminal of a memory interface of the memory buffer circuit a version of a signal received by the input circuit during a memory operation, and
wherein in the second mode, the memory buffer circuit is configured to disable the input circuit, and is configured to drive a signal on the terminal during the memory operation.

3. The apparatus, as recited in claim 1,
wherein when the memory operation is a write operation to the memory device, the memory device has a data width of at least eight bits, and the first signal is a data mask signal, in the first mode, the memory controller circuit is configured to provide the data mask signal to the memory buffer circuit, and in the second mode, the memory buffer circuit is configured to generate the data mask signal.

4. The apparatus, as recited in claim 3,
wherein the plurality of modes includes a third mode in which the memory buffer circuit is configured to disable a data mask input circuit and is configured to effectively disable a data mask input terminal during the memory operation when the memory operation is a write operation to the memory device, the memory device has a data width of four bits, and the first signal is a data mask signal.

5. The apparatus, as recited in claim 1,
wherein the memory module is a dual in-line memory module compliant with a JEDEC Double Data Rate Three standard and the memory controller circuit includes one data strobe terminal per eight data terminals and no data mask terminals.

* * * * *